(12) United States Patent     (10) Patent No.: US 8,959,574 B2
Kuhlman et al.     (45) Date of Patent: Feb. 17, 2015

(54) CONTENT RIGHTS PROTECTION WITH ARBITRARY CORRELATION OF SECOND CONTENT

(75) Inventors: Douglas A. Kuhlman, Inverness, IL (US); Paul C. Davis, Arlington Heights, IL (US); Joshua B. Hurwitz, Niles, IL (US); Alfonso Martinez Smith, Algonquin, IL (US); Loren J. Rittle, Lake Zurich, IL (US); Krunal S. Shah, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/528,911

(22) Filed: Jun. 21, 2012

(65) Prior Publication Data

US 2013/0347056 A1     Dec. 26, 2013

(51) Int. Cl.
*H04L 29/06*     (2006.01)

(52) U.S. Cl.
CPC ..................................... *H04L 29/06* (2013.01)
USPC ........................................................... 726/1

(58) Field of Classification Search
None
See application file for complete search history.

(56) References Cited

U.S. PATENT DOCUMENTS

| | | | |
|---|---|---|---|
| 6,253,203 B1 | 6/2001 | O'Flaherty et al. | |
| 6,549,922 B1 | 4/2003 | Srivastava et al. | |
| 6,859,799 B1 | 2/2005 | Yuen | |
| 6,877,134 B1 | 4/2005 | Fuller et al. | |
| 6,912,504 B1 | 6/2005 | Rashkovskiy | |
| 6,944,185 B2 | 9/2005 | Patki et al. | |
| 7,263,714 B2 | 8/2007 | Lowthert et al. | |
| 7,460,149 B1 | 12/2008 | Donovan et al. | |
| 7,519,273 B2 | 4/2009 | Lowthert et al. | |
| 7,574,579 B2 | 8/2009 | Gladwin et al. | |
| 7,606,790 B2 | 10/2009 | Levy | |
| 7,668,928 B2 | 2/2010 | Newnam et al. | |
| 7,688,853 B2 | 3/2010 | Santiago et al. | |

(Continued)

FOREIGN PATENT DOCUMENTS

| | | |
|---|---|---|
| EP | 1737236 A2 | 12/2006 |
| JP | 2000293421 | 10/2000 |

(Continued)

OTHER PUBLICATIONS

United States Patent and Trademark Office, "Non-Final Rejection" for Patent Application No. 13/528,917 dated Apr. 4, 2013, 15 pages.

(Continued)

*Primary Examiner* — Brandon Hoffman
(74) *Attorney, Agent, or Firm* — Amin, Turocy & Watson, LLP

(57) ABSTRACT

A disclosed content rights management system defines a content usage policy via a conditional rule set contained in metadata. The conditional rule set is correlated to at least one second content. An access control manager determines, dynamically, access rights conferrable to a user device or a server, based on the content usage policy and user history parameters. The embodiments may confer limited access rights for a first activity by a user device, or by a server, with respect to the protected content and the second content, and block a second activity with respect to the protected content and the second content, in response to determining that the request for the second content, in conjunction with the user history parameters, does not comply with the conditional rule set for the second activity.

17 Claims, 9 Drawing Sheets

(56) References Cited

U.S. PATENT DOCUMENTS

| | | |
|---|---|---|
| 7,809,603 B2 | 10/2010 | Steelberg et al. |
| 7,814,061 B2 | 10/2010 | Kuberka et al. |
| 7,849,105 B2 | 12/2010 | Prager et al. |
| 7,870,279 B2 | 1/2011 | Chuang et al. |
| 7,904,480 B2 | 3/2011 | Palanisamy |
| 7,917,749 B2 | 3/2011 | Ginter et al. |
| 7,930,356 B2 | 4/2011 | Gawor et al. |
| 7,930,762 B1 | 4/2011 | Blair et al. |
| 7,958,131 B2 | 6/2011 | Bodin et al. |
| 7,958,148 B2 | 6/2011 | Barnes et al. |
| 7,962,937 B2 | 6/2011 | Cho et al. |
| 7,970,761 B2 | 6/2011 | Petri |
| 8,271,751 B2 | 9/2012 | Hinrichs, Jr. |
| 2001/0014891 A1 | 8/2001 | Hoffert et al. |
| 2005/0022107 A1 | 1/2005 | Dey et al. |
| 2006/0020597 A1 | 1/2006 | Keating et al. |
| 2006/0031216 A1 | 2/2006 | Semple et al. |
| 2006/0173985 A1 | 8/2006 | Moore |
| 2008/0243784 A1 | 10/2008 | Stading |
| 2009/0125504 A1 | 5/2009 | Adams et al. |
| 2009/0144130 A1 | 6/2009 | Grouf et al. |
| 2009/0216769 A1 | 8/2009 | Bellwood et al. |
| 2009/0299990 A1 | 12/2009 | Setlur et al. |
| 2010/0023491 A1* | 1/2010 | Huang et al. ............... 707/3 |
| 2010/0125604 A1 | 5/2010 | Martinez et al. |
| 2011/0016172 A1 | 1/2011 | Shah |
| 2012/0236005 A1 | 9/2012 | Clifton et al. |
| 2013/0054603 A1 | 2/2013 | Birdwell et al. |

FOREIGN PATENT DOCUMENTS

| | | |
|---|---|---|
| JP | 2011-3987 A | 1/2011 |
| JP | 2011003987 | 1/2011 |

OTHER PUBLICATIONS

Melia, Mark & Pahl, Claus. (2010). Model-driven description and validation of composite learning content, DORAS DCU Online Research Access Service. 6 pages.

Patent Cooperation Treaty, "PCT Search Report and Written Opinion of the International Searching Authority" for International Application No. PCT/US2013/043239 dated Oct. 30, 2013, 12 pages.

Wang et al., "A Proposal on Video Editing System Coping with Rights Inheritance Management for Secondary Content" Electrical Engineering, 2008, ICEE 2008 Second International Conference on, IEEE, Piscataway, NJ, USA, Mar. 25, 2008 2 pages.

Patent Cooperation Treaty, "PCT Search Report and Written Opinion of the International Searching Authority" for International Application No. PCT/US2013/043241 dated Nov. 5, 2013, 11 pages.

Sundaram et al., "A Utility Framework for the Automatic Generation of Audio-Visual Skim" ACM Multimedia Dec. 6, 2002, pp. 189-198, Retrieved from the Internet: //www.ee.columbia.edu/1n/dvmm/publications/02/acmm2k2.pdf.

Patent Cooperation Treaty, "PCT Search Report and Written Opinion of the International Searching Authority" for International Application No. PCT/US2013/043242 dated Oct. 29, 2013, 11 pages.

Office Action for U.S. Appl. No. 13/528,917, dated Jul. 14, 2014, 40 pages.

\* cited by examiner

CONTENT RIGHTS PROTECTION WITH ARBITRARY CORRELATION OF SECOND CONTENT

CROSS-REFERENCE TO RELATED APPLICATIONS

The present patent application is related to copending U.S. patent application Ser. No. 13/528,917 "CORRELATION ENGINE AND METHOD FOR GRANULAR META-CONTENT HAVING ARBITRARY NON-UNIFORM GRANULARITY," and copending U.S. patent application Ser. No. 13/528,922, "PRIVACY MANAGER FOR RESTRICTING CORRELATION OF META-CONTENT HAVING PROTECTED INFORMATION BASED ON PRIVACY RULES," both of which are assigned to the same assignee as the present application, and both are hereby incorporated by reference herein in their entirety.

FIELD OF THE DISCLOSURE

The present disclosure relates generally to digital content and digital rights management for content.

BACKGROUND

Content, and the various types or forms of digital content that have been developed, has ushered in the need of content authors and/or owners to protect copyrighted content from piracy and other forms of unauthorized copying. Content protection regimes such as Digital Rights Management (DRM), enable enforcement of copying restrictions on content. However, such rights management regimes do not provide mechanisms for control of other aspects related to how particular content is put to use, and therefore, it is difficult or impossible to prevent unauthorized use of content other than unauthorized copying.

DETAILED DESCRIPTION

Figure 1:
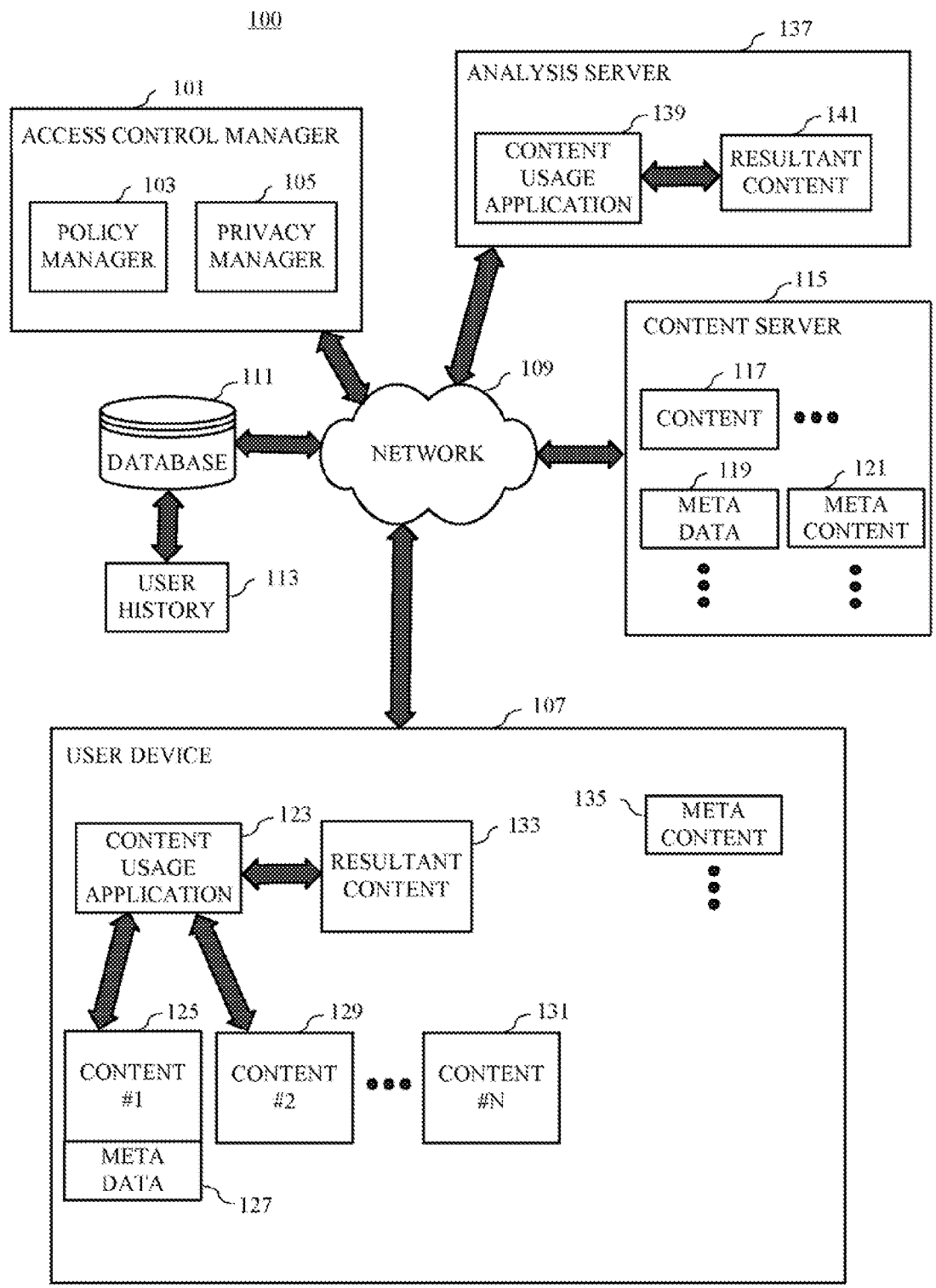
FIG. 1 is a schematic block diagram of a system architecture in accordance with some embodiments.

The disclosed embodiments provide content authors and/or other rights owners with the ability to arbitrarily correlate a piece of content with one or more additional arbitrary, pieces of content and/or meta-content. Using this inventive capability, a content owner can exercise control over a wide variety of content usage other than mere copy prevention. For example, the disclosed embodiments enable the placement of restrictions on editing and mixing content with other undesirable content to create content "mash-ups." In another example, the disclosed embodiments enable the placement of restrictions on a sequence in which content may be accessed for viewing. Various other types of control are possible using the disclosed embodiments.

The disclosed inventive embodiments enable a content author/owner to define a usage policy. In accordance with the embodiments, the usage policy is monitored and enforced by way of a conditional rule set contained in metadata that is associated with the content. In accordance with the embodiments, the conditional rule set is evaluated in conjunction with a user history to determine compliance or non-compliance with the usage policy. In some embodiments, the usage policy is monitored and enforced by way of an access control manager. The conferring of access rights, in accordance with the embodiments, is dynamic, in that, as the user history changes or evolves, the usage policy may confer, restrict or withdraw certain access rights based on past activity, in accordance with the content usage policy.

The present disclosure provides a method and apparatus for content rights management. One disclosed method begins with obtaining a conditional rule set defining a content usage policy. The conditional rule set is contained in metadata associated with a first content, and the conditional rule set is correlated to at least a second content. The method includes determining, dynamically, access rights conferrable to a user device, based on the content usage policy and user history parameters, in response to determining that a request for the second content, in conjunction with the user history parameters, complies, or does not comply, with the conditional rule set. The access rights may be conferred to a user device, a server, or a specific content usage application on a server or on a user device.

The method may include conferring limited access rights for a first activity (by, for example, a user device or a server) with respect to the first content and the second content, and blocking a second activity with respect to the first content and the second content, in response to determining that the request for the second content, in conjunction with the user history parameters, does not comply with the conditional rule set for the second activity. The method may also include conferring access rights for the second content, based on the content usage policy and the user history parameters at a first time, in response to determining that the request for the second content, in conjunction with the user history parameters at the first time, complies with the conditional rule set; and denying access rights for the second content, based on the content usage policy and the user history parameters at a second time, in response to determining that the request for the second content, in conjunction with the user history parameters at the second time, no longer complies with the conditional rule set.

The present disclosure also provides an apparatus having an access control manager. The access control manager is operative to obtain a conditional rule set that defines a content usage policy. The conditional rule set is contained in metadata associated with a first content, where the conditional rule set is correlated to at least a second content. The access control manager is operative to determine, dynamically, access rights conferrable to a user device, a server, etc., based on the content usage policy and user history parameters, in response to determining that a request for the second content, in conjunction with the user history parameters, complies, or does not comply, with the conditional rule set. The access control manager may also be operative to confer limited access rights for a first activity (by, for example, a user device or a server) with respect to the first content and the second content, and block a second activity with respect to the first content and the second content, in response to determining that the request for the second content, in conjunction with the user history parameters, does not comply with the conditional rule set for the second activity.

The access control manager may also confer access rights for the second content, based on the content usage policy and the user history parameters at a first time, in response to determining that the request for the second content, in conjunction with the user history parameters at the first time, complies with the conditional rule set; and deny access rights for the second content, based on the content usage policy and the user history parameters at a second time, in response to determining that the request for the second content, in conjunction with the user history parameters at the second time, no longer complies with the conditional rule set.

The present disclosure also provides another method of content rights management, which includes conferring, dynamically, access rights to a user device or a server, based on a usage policy, where the usage policy is defined by a conditional rule set contained in metadata associated with a first content, and the conditional rule set is correlated to at least a second content. The method may include obtaining the second content from a meta-content of the first content, the meta-content including at least one of: analysis of the first content, analysis of at least one parameter of the first content, searchable time based reference data associated with the first content, or searchable location based reference data associated with the first content.

Turning now to the drawings wherein like numerals represent like components, FIG. 1 illustrates system architecture 100, in accordance with some embodiments. As shown in FIG. 1, various user devices, such as user device 107, and various servers such as analysis server 137, communicate over a network 109 to obtain, and/or interact with content 117, obtained from content server 115. The network may be an intranet or may be the Internet, or any other suitable network, and may utilize any suitable network technology. The various user devices 107 may be any suitable user device, for example, a smart phone, laptop, personal digital assistant (PDA), electronic book reader, tablet, personal computer (PC), etc., and may employ any suitable network access technology in order to access the network 109. The content 117 may be any content, such as, but not limited to, video, audio, photographs, documents, email messages, instant messages, location information, a database element such as, but not limited to, a database row, a single database entry, etc. Put another way, the embodiments illustrated by FIG. 1 are agnostic to the type of user device, type of network, or type of content employed. The content 117 may also be accessed by a server such as, but not limited to, analysis server 137. Analysis server 137 may include a content usage application 139 that performs, for example, various analytical operations on content 117, and/or metadata 119 and/or meta-content 121, to produce a resultant content 141. Other servers, other than the example analysis server 137 may also exist, and have other content usage applications that can access and perform various usage activities or operations on content 117, and/or metadata 119 and/or meta-content 121, to produce a resultant content.

The content 117, in most embodiments, will include metadata 119. Metadata 119 may be encapsulated along with the content 117 or may be embedded into content 117 using various techniques. The metadata 119 may also be located remotely from the content 117 in some cases. For example, if the user device 107 downloads the content 117, and stores it in memory, the metadata 119 may be maintained on the content server 115, and accessed as needed. The metadata 119 may also provide other information related to, and/or about, the content 117, such as, but not restricted or limited to, authorship/ownership, date of creation, place of creation, version, or any other related information, etc.

In accordance with the embodiments, the metadata 119 will include a set of conditional rules that are used to determine how the content 117 may be used by the user device, when interacting with other content. That is, the present embodiments enable a content owner or author to define a usage policy for a specific piece of content and/or meta-content. A usage policy, or content usage policy, defines how content and/or meta-content may be utilized in conjunction with other content and/or meta-content. Compliance or non-compliance with the usage policy, in accordance with the embodiments, is evaluated by determining whether a content request, in conjunction with user history parameters, complies, or does not comply with the conditional rule set contained by the metadata. The conditional rule set provides a set of requirements that may include precedent condition requirements, Boolean logic conditions, or other requirements. The conditional rule set is a machine interpretable set of conditional rules that can be interpreted by, in one example, software or firmware executing on a processor. In some embodiments, the conditional rule set will be contained in metadata in an encrypted format that is not accessible without proper authorization, such as required encryptions keys, passwords, authorization codes, etc. User history parameters may include, but are not limited to, content or meta-content identification, dates of access, times of access, number of access attempts or number of accesses, usage activity identifications, etc. For example, a user history may contain user history parameters that indicate when a piece of content was edited (i.e. a usage activity identification) by the user. In the example of FIG. 1, the metadata 119 conditional rules define how the content 117 may be used in conjunction with other content and/or meta-content. For example, the metadata 119 conditional rules may be used to determine how the content 117 may be accessed, edited, or otherwise utilized based on, for example, user history 113 related to user device 107, and content 117, and other content, other than content 117. The database 111 may also contain user history that is associated with the analysis server 137. That is, a user history for the analysis server 137 would show what content the content usage application 139 accessed and how that content was used. For example, user history 113 contains user history parameters that may indicate how and when content 117 was accessed and used. The user history may also have information related to "other content" which may include the meta-content 121, other meta-content, other than meta-content 121, or may include metadata such as metadata 119 or other metadata associated with other content or meta-content.

Examples of these scenarios to facilitate understanding of the various embodiments are provided herein below.

Figure 10:
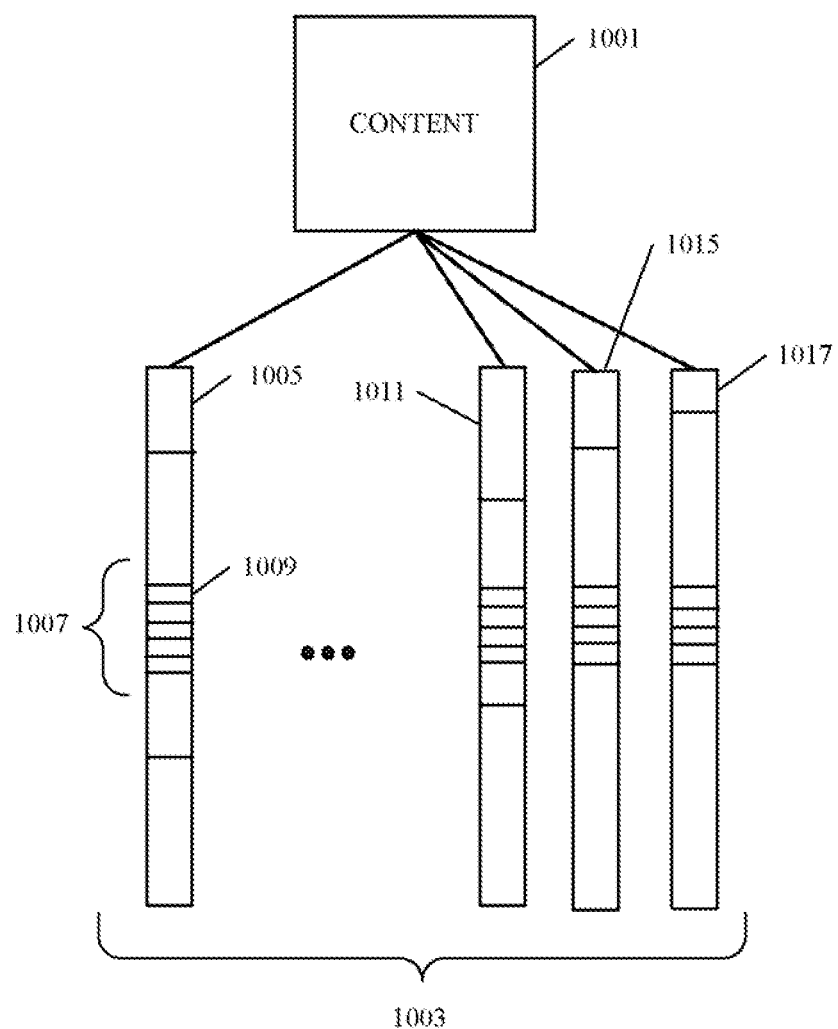
FIG. 10 is a block diagram illustrating the relationship of content to various granular meta-content elements where each meta-content elements granularity defines meta-content segments and items. The meta-content elements, segments and items may be subject to conditional rules in accordance with the embodiments.

In accordance with some embodiments, meta-content 121 and meta-content 135 may be a type of searchable indexed meta-content that has a relation to the content 117. An example of such searchable, indexed meta-content is best understood with reference to FIG. 10. FIG. 10 illustrates the relationship of primary content 1001 to associated meta-content elements 1003. As shown in FIG. 10, the primary content 1001 may be associated with a plurality of meta-content elements such as meta-content element 1005, 1011, 1015 and 1017. Each of the meta-content elements, such as meta-content element 1005, has an associated but arbitrary granularity. The granularity of the meta-content elements 1003 may be related to segmentation based on intervals of time, location, or any other suitable criteria. As shown in FIG. 10, the meta-content element 1005 includes meta-content segment 1007 which is further subdivided into meta-content items 1009. Therefore, in accordance with the various embodiments, primary content 1001 and/or one, or all, of the meta-content elements 1003 may also have conditional rules that define how the primary content 1001 and/or meta-content elements 1003 may be accessed, edited, or otherwise utilized based on, for example, user history 113 related to user device 107, (or a user history related to analysis server 137), and primary content 1001, and other content, such as, but not limited to, the meta-content elements 1003. The various embodiments require a user history that is related to the content or meta-content, where the user history may be stored on a user device, a server having a content usage application, remotely located on a server or database; or distributed among varied locations. In some embodiments, some or all of the meta-content elements 1003 may be generated by a server such as analysis server 137 illustrated in FIG. 1. For example, the content usage application 139 may access content 1001, subject to the applicable conditional rule set for content 1001, and produce a meta-content element as resultant content 141. In another example, the content usage application 139 of analysis server 137, may access one or more of the meta-content elements 1003, subject to the applicable conditional rule set for each of meta-content element, and produce a new meta-content element as resultant content 141.

The term "meta-content" as used herein may encompass, or include, various types and forms of metadata associated with a piece of content. That is, the term meta-content as used herein may refer to metadata that may be considered content in and of itself For example, such meta-content may be a multimedia content or other audiovisual content such as a "director's cut" of a movie content, or may be analysis output from a visual detector or some other analysis tool. In other words, meta-content may include other content (i.e. "second" or "secondary" content) that provides, but is not limited to, information, analysis, contextual information, etc., about or related to the main or primary content. Such meta-content may include, but is not limited to, date information, time information, location information, annotations, various properties of the content, keyframes, excitement level, associated Twitter® posts, facial recognition information, optical character recognition, object recognition, speech-to-text or other speech recognition information, etc., closed captioning, or for example, analysis of such text streams to produce keyterm extraction, named entity recognition, and other text analyses; or related content, related segments, Twitter® feeds, excitement levels, aggregation of an analysis, summaries, and the like, etc.

As shown in FIG. 1, the system architecture 100 also includes access control manager 101, in accordance with the embodiments. The access control manager 101 may include a policy manager 103, and a privacy manager 105 which are described in further detail herein below. The access control manager 101, in the various embodiments, may reside on, or be integrated with, the content server 115, may reside on a user device 107, may reside on analysis server 137, or may be a distributed access control manager, part on a server and part on a user device. In some embodiments, the access control manager 101 may be an independent network entity, for example a server, accessible over the network 109, as illustrated in FIG. 1. The access control manager 101 controls how content 117 is accessed and used, in conjunction with metadata 119 conditional rules and user history 113. The user history 113 is a user history related to the user device 107, where each user device may have an independent user history, or, the user history 113 may be tied to an individual user regardless of which device the individual user may be employing to access the content 117. A user history may also be related to analysis server 137, or may be tied to individual users of server 137, or may be tied to specific content usage applications of analysis server 137 or to specific users of a content usage application, etc. The user history 113 may be stored on a remote database, such as database 111 which is accessible over the network 109. The access control manager 101 controls how content 117 is accessed and/or used by conferring access rights. The access rights enable the user device 107, or a server such as analysis server 137, to obtain the content and/or perform a given usage activity. Access rights may be conferred or withdrawn in various ways using various technologies such as, but not limited to, scrambling/descrambling, encryption/decryption, embedding tags, or any other suitable mechanism, etc., as needed to enforce a usage policy in accordance with the embodiments.

In operation, the user device 107, or analysis server 137, may send a content request, via the network 109, to content server 115 in order to download, clip, mash-up, modify, redistribute, sell, aggregate information from, or otherwise use, content 117. The content "request" may be a message that is generated by the user device 107 or analysis server 137, or some other server, without any specific user action or user involvement. In other words, a specific content may be present on the content server 115, or on the user device 107, but may be "locked" for certain usage activities until an access right for that activity is conferred to the requesting entity. For example, the user may launch a content usage application 123 which may enable one or more usage activities with respect to the content (such as, but not limited to, view/edit). The conditional rules in the metadata for that content may trigger sending a content request, which would be received or intercepted by the access control manager 101. Usage activities may be any of various actions that can be taken with respect to the content, for example, viewing, editing, analysis, etc. Therefore, a content usage application may be a viewer, editor, analysis application, or any other suitable application that works with content. Some specific examples of a content usage application include, but are not limited to, video viewers such as MPEG4 compatible viewers, video editors, photo viewer and editors, word processors, email applications, Instant Messaging (IM) applications, audio players such as MP3, etc. It is to be understood that the user device may have and employ various content usage applications, and that content usage application 123 is only one example of a usage application that may be available for use on user device 107. Furthermore, it is to be understood that, in addition to being a message generated by the user device 107, a content "request" may be a message that is generated by a server, and/or an application residing on a server, such as, but not limited to an analysis application, an aggregation application, or any other application, etc. For example, analysis server 137, or content usage application 139, may generate a content request. In other words, a content request may be generated by any requesting entity such as user device 107, analysis server 137, or some other server, etc.

In accordance with the embodiments, the access control manager 101 may intercept the content request prior to the request being granted or denied, and access rights being conferred to the user device. That is, the access control manager 101 obtains, and evaluates, metadata conditional rules, associated with the content in question, to verify whether the user, or user device 107, is authorized to perform the given usage activity on the content 117, which then directly affects download and access rights. This process is dynamic, in that, as the user history 113 of the user device 107 changes, the access rights that may be conferrable to the user device 107 also changes. Therefore, the access control manager 101 dynamically confers access rights to the requesting entity, such as user device 107, in conjunction with the user history 113, and the metadata conditional rules associated with a given content. Unlike previous systems for management of digital rights, the present embodiments provide the advantage of a correlation between a first content and at least a second content, to prevent certain usage activities from occurring that are undesirable to the first content author or owner. Likewise, the correlation between the first content and the second content provide the advantage of enabling desirable usage activities to occur. These advantageous features were not possible using previous rights management systems.

It is therefore to be understood that, in the various embodiments, the "content requests" are not limited or restricted to requests to download or obtain viewing access to content. In accordance with the present disclosure, content requests may be invoked by, and/or may include, attempts to modify, analyze, or otherwise obtain content access that involves performing usage activities (i.e. actions) on, or using, the content in ways other than downloading or viewing of the content itself In one brief example, a user may wish to use the content usage application 123, of user device 107, to create highlight scenes from a video content from content server 115. In accordance with the present embodiments, the access control manager 101 will obtain, via the network 109, the user history 113 from database 111, and the metadata 119 which includes the conditional rules applicable to the video content. The access control manager 101 will apply the rules based on the user history 113 to determine whether the intended usage activity is allowable, and, if so, will confer access rights that will enable the user device 107 to obtain the content and/or perform the usage activity. Therefore, in this example, the user device 107 would be allowed to create the highlight scenes, by editing the video content from content server 115. In another brief example, the user device 107 may have stored content, such as first content 125, second content 129, up to n-th content 131. The first content 125 may have associated metadata 127, which in this example, is contained or embedded along with the first content 125. The user may attempt the usage activity of creating a "mash-up" video by combining portions of the first content 125 with portions of the second content 129, and, possibly portions of other content up to the n-th content 131. For the present brief example, the resultant content 133 illustrated in FIG. 1 may be the mash-up video creatable by editing the first content 125 and at least the second content 129. In accordance with the embodiments, the usage activity of creating the mash-up video will invoke access of the conditional rules contained in metadata 127 for the first content 125. As shown in FIG. 1, the access control manager 101 may include a policy manager 103, that acts to prevent undesirable and unauthorized usage activities for content. In the present example, the access control manager 101 policy manager 103 may determine that the usage policy does not permit a mash-up of the first content 125 with the second content 129 and will not confer access rights to the user device 107 for this purpose. However, a mash-up may be permitted between the first content 125 and the n-th content 131. In this case, the policy manager 103 of the access control manager 101 may confer access rights to the user device 107, enabling the content usage application 123 to operate, i.e. perform usage activities, on the first content 125 and the n-th content 131. One advantageous example use case of the above is to enable a content author/owner for children's content to prevent video mash-ups with adult content.

The access control manager 101 may also include a privacy manager 105 in some embodiments. The privacy manager 105 may access the user history 113, and/or a user profile that contains user specific information. The privacy manager 105 may restrict or prohibit certain information from being collected into metadata where that information is related to the user and the user's access to content or other metadata. In embodiments having a privacy manager 105, the privacy manager works with the access control manager 101 and policy manager 103, to ensure that users who require no data collection in their context are not shown or provided content, where the usage policy for that content requires data collection from the user in order to be consumed. In other words, some content authors or owners may set usage policies where the content metadata conditional rules require certain types of information to be collected from the users. Because such information collection may not be appropriate for certain users, the privacy manager 105 may, in some embodiments, block content for those specific users.

Figure 2:
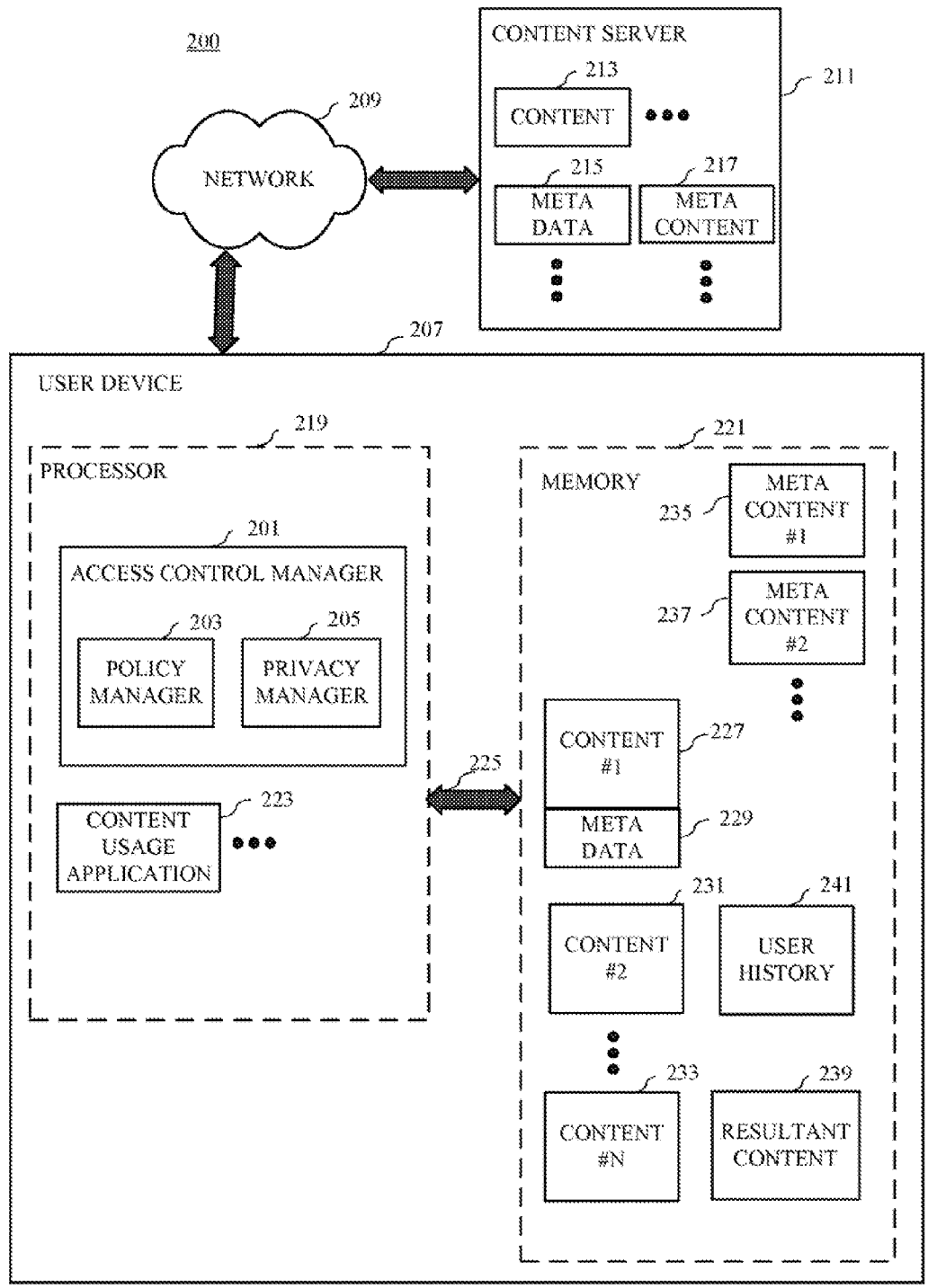
FIG. 2 is a schematic block diagram of an embodiment in which an access control manager resides on a user device.

FIG. 2 is a schematic block diagram of an embodiment in which an access control manager 201 resides on a user device 207. That is, the user device 207 is an apparatus having an access control manager 201 in accordance with the embodiments. The access control manager 201 may include a policy manager 203 and a privacy manager 205 in some embodiments. The privacy manager 205 operates similarly to the privacy manager 105 described with respect to FIG. 1. In the system architecture 200, the access control manager 201, in accordance with the embodiments, may be implemented in various ways on the user device 207. For example, the access control manager 201 may be implemented as software and/or firmware executing on one or more programmable processors, ASICs, DSPs, hardwired logic or combinations thereof. In the example of FIG. 2, the access control manager 201 is shown as software and/or firmware executing on processor 219. The access control manager 201 is operative to obtain a conditional rule set contained in metadata, and interpret the conditional rule set to enforce a usage policy with respect to content or meta-content related to the conditional rule set. The processor 219 is operatively coupled to memory 221 via a communication bus 225, and may communicate with the memory 221 as required. That is, the processor 219 and memory 221 may communicate with each other by, for example, a communication bus 225, which also runs throughout the user device 207 circuits and systems. It is to be understood therefore that FIG. 2 is for illustration purposes only, and is not to be construed as a complete schematic diagram of a user device and/or its internal circuits and systems. FIG. 2, as well as the other figures included in the present disclosure, are for the purpose of describing, to one of ordinary skill, the various requirements for making and using the embodiments herein disclosed and, therefore, are limited to such components necessary to facilitate such understanding. Therefore various other components and/or systems, that are not shown in the figures, may be required to provide a complete user device, content server, network, etc., as would be understood by one of ordinary skill in the art.

Therefore, as shown in FIG. 2, the access control manager 201, is also operatively coupled to the memory 221, and may access metadata 229 for content 227. The access control manager 201 may also access meta-content 235 and meta-content 237 in some embodiments. The access control manager 201 may also access metadata 215, and possibly meta-content 217, which are associated with content 213 and located on content server 211. The access control manager 201 accesses the content server 211 via the network 209. Because the content usage application 223 can work with content located in memory 221 and/or content located on content server 211, the access control manager 201 may confer, restrict or withdraw access rights to the user device 207 for usage activities as appropriate for a given content usage policy for any such content. In the example embodiment of FIG. 2, the user history 241 is also located in memory 221. The access control manager 201 therefore, evaluates the metadata conditional rules based on the user history 241 contained in memory 221. In one example of operation, the user may attempt to use content usage application 223 to create a mash-up of content 213, located on content server 211, with content 227, located in memory 221. Such a mash-up may result in, for example, resultant content 239. In the present example, resultant content 239 is the result of some previous usage activity engaged in by user device 207, which involved content 231 and various other pieces of content up to, and including n-th content 233.

As one may understand, there may be situations in which several pieces of content are involved and where one or more have associated metadata with conditional rules. In such scenarios, the policy manager 203, must evaluate each conditional rule set for each piece of content. In other words, the policy manager 203 ensures that the usage policy for any piece of content will not be violated, provided that the piece of content has the metadata conditional rules in accordance with the embodiments. Therefore, continuing with the example of operation, the access control manager 201 will receive content requests for content 213 and content 227. It is to be understood that content requests may be related to user attempted usage activities as was discussed briefly above with respect to FIG. 1. For example, when the user runs content usage application 223 and attempts to perform a usage activity with a given piece of content, this action may constitute sending a content request in accordance with some embodiments. In other words, the attempt to access content 213 and content 227 via content usage application 223 may constitute sending a content request for content 213 and another content request for content 227. The access control manager 201 will receive both of these content requests. As shown in FIG. 2, content 213 has associated metadata 215, and content 227 has associated metadata 229. Both metadata 215 and metadata 229 contain conditional rules for their respective pieces of content, content 213 and content 227. Therefore, the policy manager 203 must evaluate both conditional rules sets, in conjunction with the user history 241, before the policy manager 203 can determine what, if any, access rights can be conferred to user device 207. For example, the usage policy for content 213 may permit creating the mash-up with content 227. However, the usage policy for content 227 may not allow the mash-up with content 213. Therefore, in this example, the policy manager 203 would enforce the usage policy of content 227 and prevent the content usage application 223 from accessing content 213 to create the content mash-up. In other words, the policy manager 203 may enforce the most restrictive conditional rule when multiple conditional rule sets are involved. Although, in the present example, the usage policy for content 227 prevented creation of the mash-up with content 213, the usage policy may allow other usage activities, such as, viewing content 213. Various other usage scenarios in accordance with the embodiments may occur to those of ordinary skill.

It is to be understood that, the various embodiments operate independently from, or in conjunction with, other unrelated digital rights management (DRM) regimes. For example, content 213 and content 227 may be subject to a DRM regime in addition to having the metadata conditional rules of the various embodiments. In one example, content 213 may be subject to a DRM regime in which user device 207 is not authorized to access or copy content 213. The DRM regime would therefore prevent user device 207 from accessing or copying content 213, independently from the usage policy requirements of the herein disclosed embodiments. Put another way, each piece of content may be subject to other DRM requirements, in addition to, the usage policy of the various embodiments. Therefore, the usage policies, in accordance with the embodiments, may be supplemental, or in addition to, any other existing DRM regimes to which a piece of content is subject. The various embodiments may operate along with such other DRM regimes to provide content authors/owners with the advantages of being able to set and enforce usage policies in accordance with the embodiments.

Figure 3:
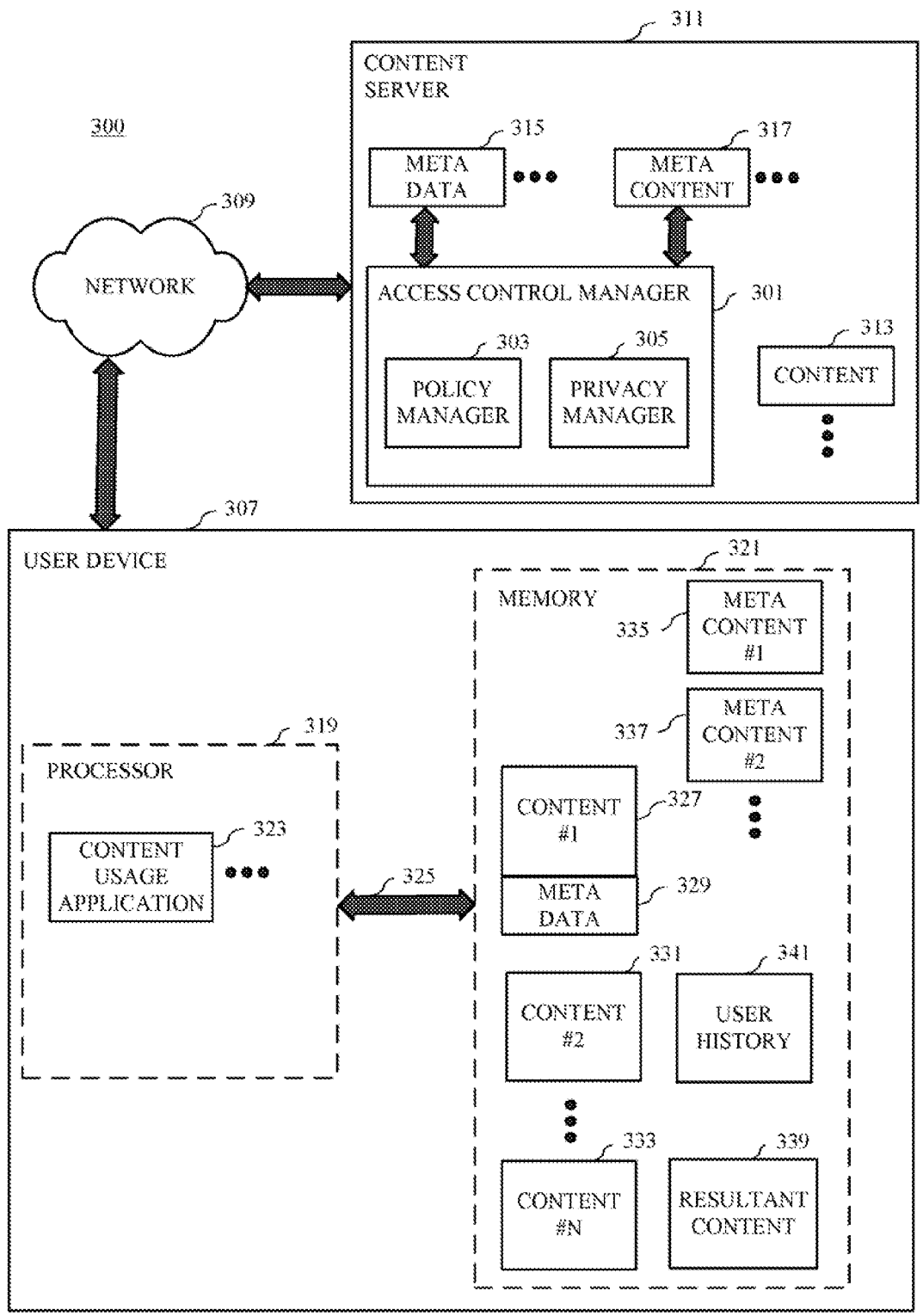
FIG. 3 is a schematic block diagram of an embodiment in which an access control manager resides on a content server or is otherwise integrated with, or into, a content server.

FIG. 3 is a schematic block diagram of an embodiment in which an access control manager resides on a content server or is otherwise integrated with, or into, a content server. In the system architecture 300, access control manager 301 is located on content server 311. That is, in the example embodiment of FIG. 3, the content server 311 is an apparatus having an access control manager 301 in accordance with the embodiments. The access control manager 301 may include a policy manager 303 and a privacy manager 305 in some embodiments. The privacy manager 305 operates similarly to the privacy manager 105 described with respect to FIG. 1 and privacy manager 205 described with respect to FIG. 2. In the system architecture 300, the access control manager 301, in accordance with the embodiments, may be implemented in various ways on the content server 311. For example, the access control manager 301 may be implemented as software and/or firmware executing on one or more programmable processors, ASICs, DSPs, hardwired logic or combinations thereof In the example of FIG. 3, the access control manager 301 may be considered as software and/or firmware executing on a processor (not shown) of content server 311. That is, for the example illustrated by FIG. 3, the content server 311 is exemplified as a network entity, accessible by various user devices, such as user device 307, via a network 309. The content server 311 may store and provide various content and various types of content, for example, content 313. Content 313 may have associated metadata 315, which may include conditional rules in accordance with the embodiments. Content 313 may also have associated meta-content 317 in some embodiments. The access control manager 301 may therefore access any associated metadata or meta-content, such as metadata 315 and meta-content 317.

In the example of FIG. 3, the user device 307 operates similarly to the user devices illustrated in FIG. 1 and FIG. 2. However, in accordance with the embodiment illustrated in FIG. 3, a content request message will be sent from the user device 307 to the access control manager 301, via the network 309. More specifically, the content usage application 323, which may be a software application executing on processor 319, may cause a content request to be sent to the access control manager 301, by an attempted usage activity with content located in memory 321 of user device 307. The processor 319 is operatively coupled to the memory 321 via, for example, a communication bus 325. As in the embodiments of FIG. 1 and FIG. 2, the memory 321 may store various pieces of content, such as first content 327, second content 331, up to an n-th content 333. The first content 327 may have associated metadata 329 which includes the conditional rules in accordance with the embodiments. The first content 327 may also have associated meta-content 335 in some embodiments. Likewise, the second content 331 may have associated meta-content 337 in some embodiments, and may also have associated metadata. In the example of FIG. 3, the user history 341 is also stored in memory 321.

In one example of operation, the user may use the content usage application 323, and attempt to create a content mash-up using a first content 327 and a second content 331, both located in memory 321, and a third content 313, located on the content server 311. In the present example, first content 327 includes metadata 329 having conditional rules in accordance with the embodiments. Content 313 has associated metadata 315 also having conditional rules in accordance with the embodiments. Second content 331 does not have any associated metadata with conditional rules, although second content 331, and the other content, may be subject to some other DRM requirements.

The user's attempt to edit the first content 327, will cause a content request to be sent via network 309 to the content access control manager 301 of content server 311. The access control manager 301 will access the metadata 329 to obtain the conditional rules applicable to the first content 327, and will obtain metadata 315 from the content server 311 for the third content 313. The access control manager 301 will also access the user history 341. Because the second content 331 does not have associated metadata and therefore does not have any associated conditional rules, there is nothing to access by the access control manager 301. However, the conditional rules of one, or both, of metadata 329 and metadata 315 may be correlated to the second content 331 in some way. For example, the conditional rules of metadata 329 may prohibit first content 327 from being combined with second content 331 thereby prohibiting the mash-up. However, the metadata 315 conditional rules may permit a mash-up with second content 331, but prohibit a mash-up with first content 327. In this example scenario, the policy manager 303 would prevent the usage activity of combining first content 327 with second content 331. However, the access control manager 301 would confer access rights to the user device 307 so that the content usage application 323 may access content 313 from the content server 311, and create the mash-up of content 313 with second content 331, to produce resultant content 339.

A content mash-up, as described briefly above, is created by combining portions of two or more pieces of content to create a resultant content. In accordance with the embodiments, such a mash-up may be created between the same, or different, content types. The mash-up may be considered, for example, a derivative work in some circumstances. As would be expected, authors/owners of content may want to control use of portions or segments of their content, when used by permission to create resultant content, such as resultant content 339. In accordance with the embodiments, the conditional rules relevant to specific content portions or segments will follow along with the resultant content. For example, resultant content 339 may be a mash-up of second content 331 and content 313 as in the above operational example. As in the example, second content 331 does not have any associated conditional rules. Content 313 however, has associated metadata 315 which contains conditional rules in accordance with the embodiments. The resultant content 339, upon creation, will have associated metadata that includes conditional rules in accordance with the embodiments. The conditional rules will be applicable to the content 313 segments that form resultant content 339.

Therefore, if the user of user device 307 attempted to use content usage application 323 to attempt a mash-up between resultant content 339 and first content 327, the policy manager 303 would evaluate conditional rules in metadata associated with resultant content 339. These conditional rules would follow from metadata 315 for content 313. Therefore, the content usage application 323 would be prevented from editing resultant content 339, to extract portions of content 313, and attempt to combine them with first content 327. In other words, portions of content protected by conditional rules would continue to be subject to the conditional rules, even when the portions are included in a resultant content, such as resultant content 339. Therefore, in accordance with the embodiments, a user could not circumvent a usage policy by creating a permissible mash-up, in order to edit out content and perform an impermissible usage activity.

Figure 4:
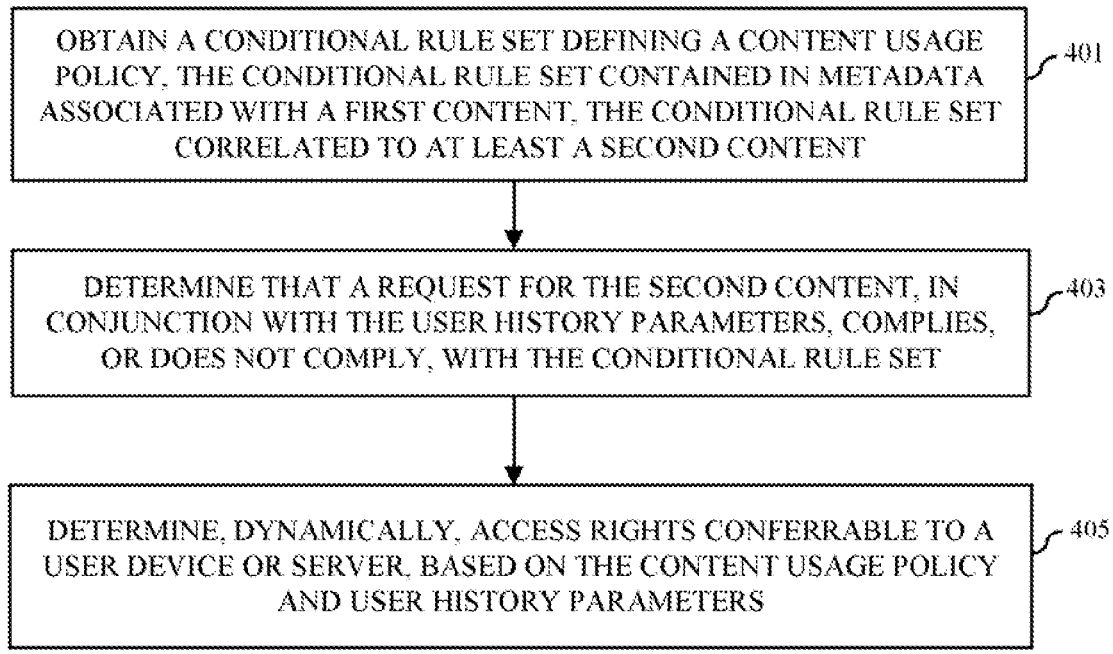
FIG. 4 and FIG. 5 are flow chart diagrams illustrating high level operation of the various embodiments with respect to a request for content.
Figure 5:
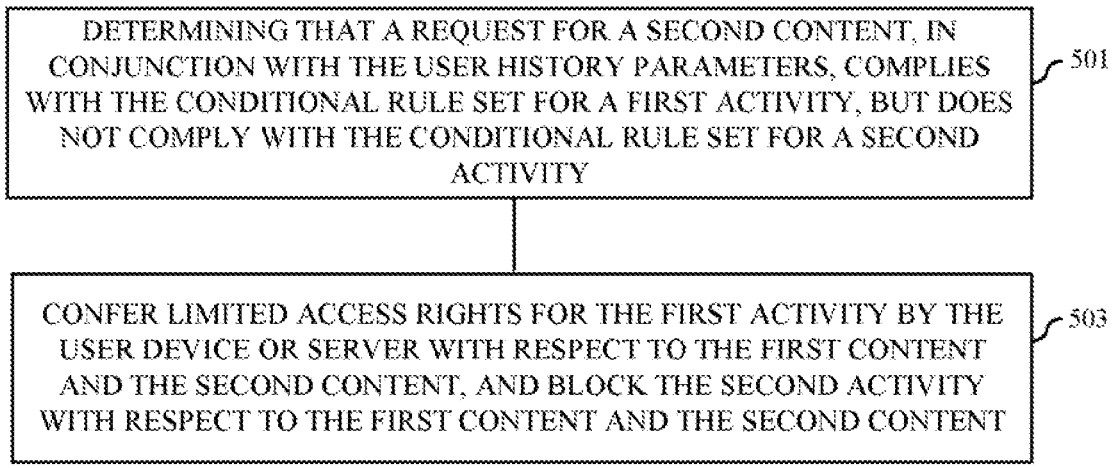

FIG. 4 and FIG. 5 are flow chart diagrams illustrating high level operation of the various embodiments with respect to a request for content. The embodiments enable defining a content usage policy by a conditional rule set contained in metadata and associated with a piece of content. Beginning with FIG. 4, block 401, an access control manager may obtain a conditional rule set defining a content usage policy for a first piece of content. The conditional rule set is contained in metadata associated with the first content and is correlated to at least a second content. In 403, the access control manager may determine whether a request for the second content, in conjunction with user history parameters, complies, or does not comply, with the conditional rule set. This is accomplished by, for example, the access control manager as described in FIG. 1, FIG. 2 and FIG. 3. As shown in 405, the access control manager determines, dynamically, access rights conferrable to a user device or a server, based on the content usage policy and user history parameters. For example, a policy manager of the access control manager may evaluate the conditional rule set in conjunction with the user history. The conferring of access rights is dynamic, in that, for example, the conferrable access rights may change as the user history parameters change. Access rights may thereby be conferred, modified or withdrawn/revoked, in response to changes in the user history. FIG. 5 illustrates, in 501, that the access control manager may determine that a request for a second content complies with the conditional rule set for a first usage activity, but not for a second usage activity. As shown in 503, the access control manager may confer limited access rights by allowing the first usage activity, but blocking the second usage activity. Examples of this scenario were described with respect to FIG. 1, FIG. 2 and FIG. 3.

Figure 6:
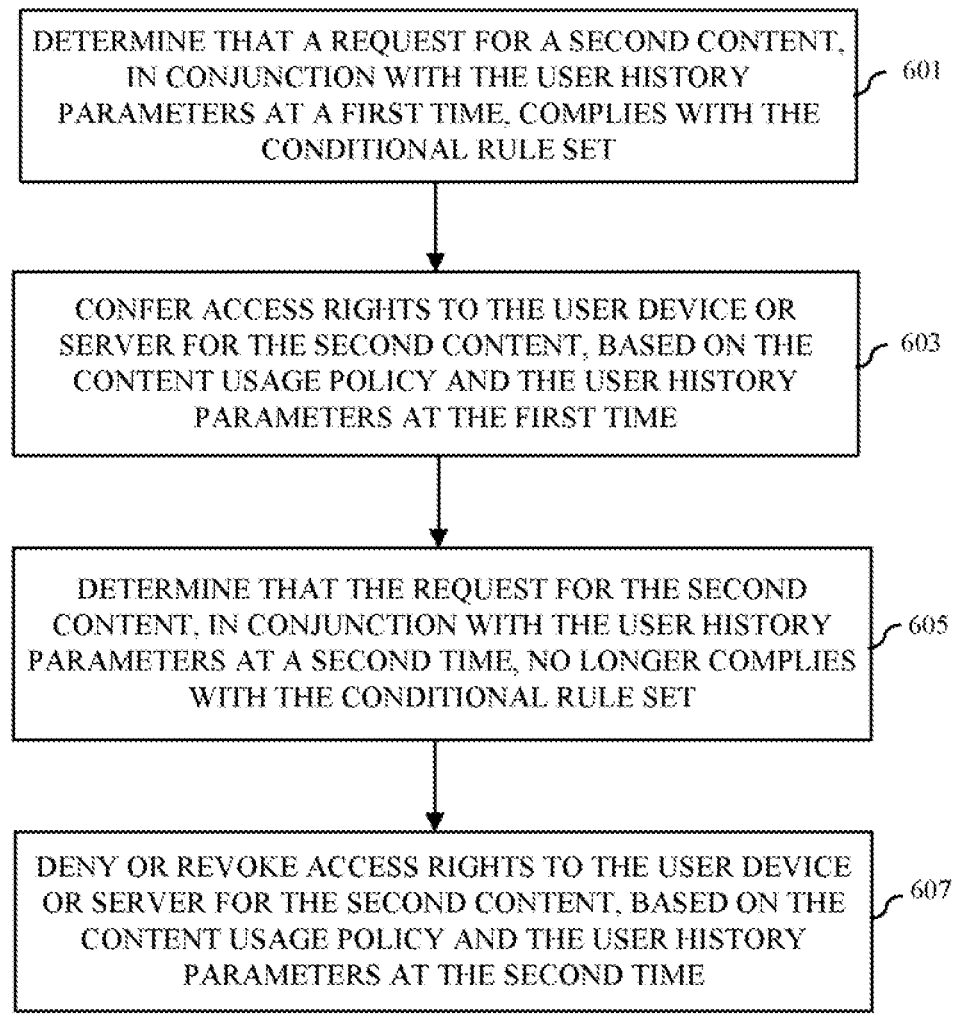
FIG. 6 is flow chart diagram illustrating high level operation of the various embodiments with respect to content usage requests as the user history changes over time.

FIG. 6 is flow chart diagram illustrating high level operation of the various embodiments with respect to content usage requests as the user history changes over time. In 601, an access control manager may determine that a request for a second content, in conjunction with the user history parameters at a first time, complies with the conditional rule set. As shown in 603, the access control manager may confer access rights to a user device, or a server, for the second content based on the content usage policy and the user history parameters at the first time. However, as briefly discussed above, the user history parameters may change and evolve as the user (or a server) engages in various usage activities. Therefore, in 605, the embodiments may determine that the request for the second content, in conjunction with the user history parameters at a second time, no longer comply with the conditional rule set and therefore do not comply with the content usage policy. As shown in 607, the embodiments may deny or revoke access rights to the user device or the server for the second content, based on the content usage policy and the user history parameters at the second time. Additionally, a content request may be denied at a first time, and access rights may be conferred for a content request at a second time, based on the user history parameters providing a later compliance with the content usage policy. Among the various advantages, the capabilities of the embodiments as illustrated in FIG. 6 provide content authors/owners with the ability to set usage policies based on time, and/or user behavior. This capability was not possible with existing content protection regimes such as previous DRM regimes.

Figure 7:
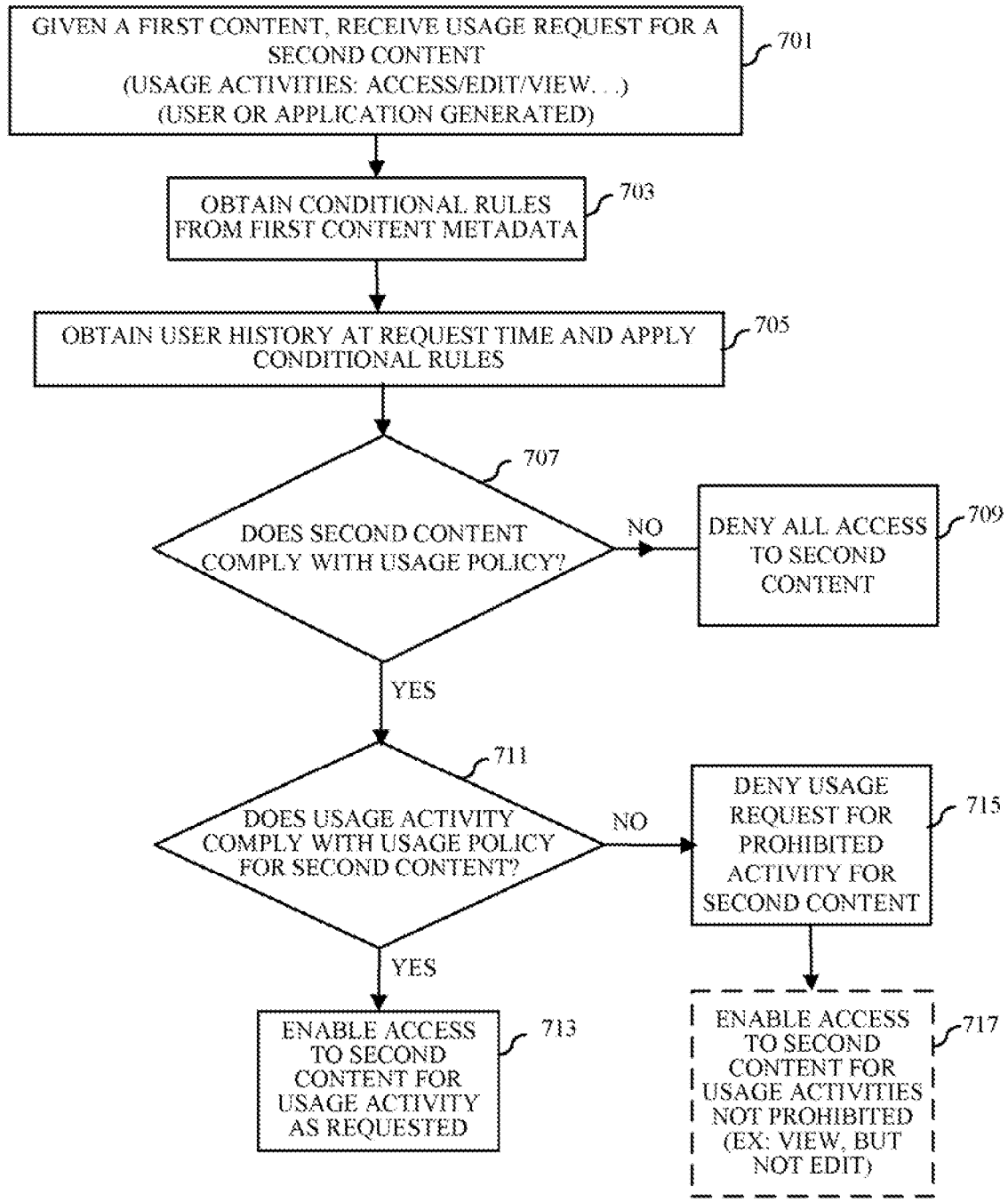
FIG. 7 is a flow chart diagram illustrating how metadata content rules impact requests related to other content for various usage activities, in accordance with the various embodiments.

FIG. 7 is a flow chart diagram illustrating how metadata content rules impact requests related to other content for various usage activities, in accordance with the various embodiments. For example, in 701, given a first content, the embodiments may receive a content usage request for a second content. The content usage activities may be, for example, editing, viewing, editing to combine, or any other type of usage activity. The content usage request, in accordance with the embodiments, may be generated by a user or may be application generated. For example, a user may, via a content usage application resident on a user device, access a web content server, and attempt to access content. The user action of requesting the content from the web content server may be considered the content usage request, or, more generally as used herein, a content request. In another example, the user may, via the same or a different content usage application resident on the user device, attempt to access content stored in the user device memory. The attempted usage activity, i.e. attempting to do something with the stored content using the content usage application, would generate the content usage request. In some embodiments, this may be accomplished by the user device processor, which performs action based on the content metadata and instructions tied to the metadata conditional rules. That is, when the content access is attempted, the user device processor runs code from the content metadata that must be executed in order to access the content. The code causes the processor to generate a content usage request for that content, and if needed, send information about correlated second content, etc., up to, and including, an n-th content, to the access control manager. Then, as shown in 703, the access control manager obtains the conditional rules from the first content metadata. In some embodiments, the content request, or content usage request, may include the relevant metadata. Therefore, in some embodiments, the access control manager may obtain the metadata via reading it from the content request, or content usage request. As discussed in various examples provided above, the access control manager may also obtain conditional rules for other content that may be involved and may need to make decisions giving precedent to some conditional rule sets over other conditional rule sets. Examples of such scenarios have been provided above.

In 705, the access control manager obtains the user history at the time of the content usage request, and applies the conditional rules to evaluate compliance with the content usage policy. The access control manager may obtain and access the user history via a pull operation. However, a push operation may also be used in some embodiments. In one example embodiment, the user history, or relevant portions thereof, may be sent to the access control manager in the content request, or content usage request. Therefore, in some embodiments, the access control manager may obtain the user history parameters by reading the content request, or content usage request. If use of the second content with the first content complies with the usage policy in 707, the access control manager determines whether the usage activity is in compliance as shown in 711. If use of the second content with the first content does not comply with the usage policy in 707, then all access to the second content may be denied as shown in 709. In one example this type of action may occur with respect to sequential viewing of content. For example, an author/owner of a series show may define a usage policy that prohibits the viewing of episodes out of sequence. That is, if a user who viewed the first episode attempts to watch the third episode before viewing the second episode, access to the third episode may be prohibited. However, the embodiments confer access right dynamically. Therefore, if the user thereafter viewed the second episode, then the access control manager could confer access rights to view the third episode, afterwards, based on the changed user history. Various other ways of using the conditional rules may be envisioned in accordance with the embodiments in light of the teachings and examples provided herein.

Returning to FIG. 7, if the usage activity using the second content complies with the usage policy of the first content in 711, the embodiments confer access to the second content for the usage activity requested, as shown in 713. However, if non-compliance is determined in 711, then the usage activity will be prohibited for the second content as shown in 715. As discussed above in various examples, the embodiments may confer access rights for other usage activities that are not prohibited, as shown in 717. For example, viewing may be allowable, but editing may be prohibited.

Figure 8:
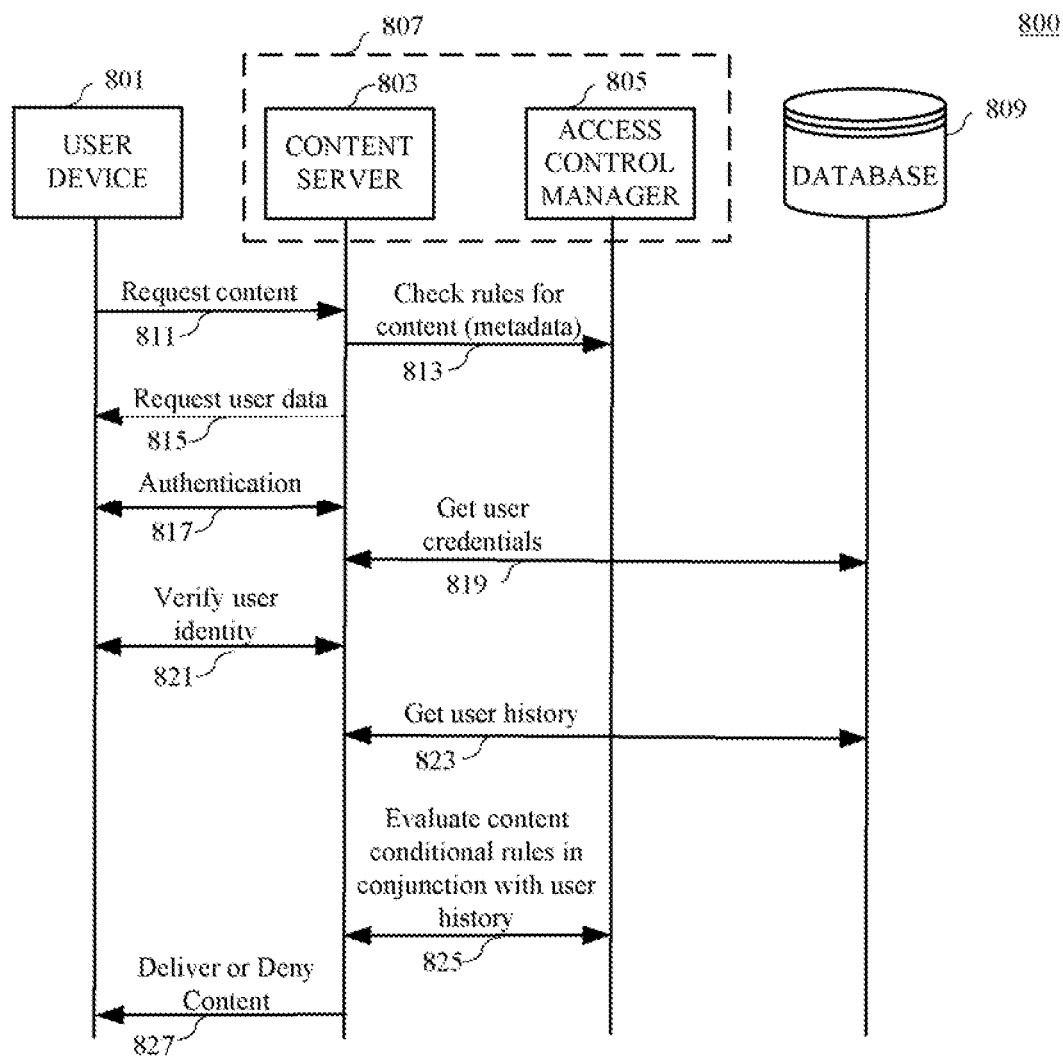
FIG. 8 is a message flow diagram that illustrates further operation details of an access control manager in accordance with some embodiments.

FIG. 8 is a message flow diagram 800 that illustrates further operation details of an access control manager in accordance with some embodiments. The access control manager may be a separate network entity as shown in FIG. 1, on a user device as shown in FIG. 2, part of a content server as shown in FIG. 3, or a distributed access control manager, part on a server, part on a user device, etc., in accordance with the embodiments. For purposes of example, in FIG. 8, the access control manager 805 may be located on a network entity 807, such as a physical server, that also includes content server 803. In other words, the content server 803 may be implemented as content server application software running on a physical network server (i.e. network entity 807) along with the access control manager 805. The user device 801 may sent a request for content 811 to the content server 803. The request for content 811 may be a content usage request etc., as described in the various examples provided above. The content server 803 may provide content metadata to the access control manager 805 for usage policy compliance evaluation. The access control manager 805 will check the metadata conditional rules for the content as shown by 813. The content server 803 may request user data 815 and perform authentication 817. The content server 803 may also obtain user credentials 819, which may be located on a remote database 809 in some embodiments. The content server 803 may verify the user's identity 821 and obtain the user history 823 which may also be located on remote database 809 in some embodiments. The access control manager 805 may then evaluate the content conditional rules, in conjunction with the user history parameters as shown by 825, to determine whether the request for content 811 complies, or does not comply, with the content usage policy. The content server 803 may then deliver or deny the content request 827.

Figure 9:
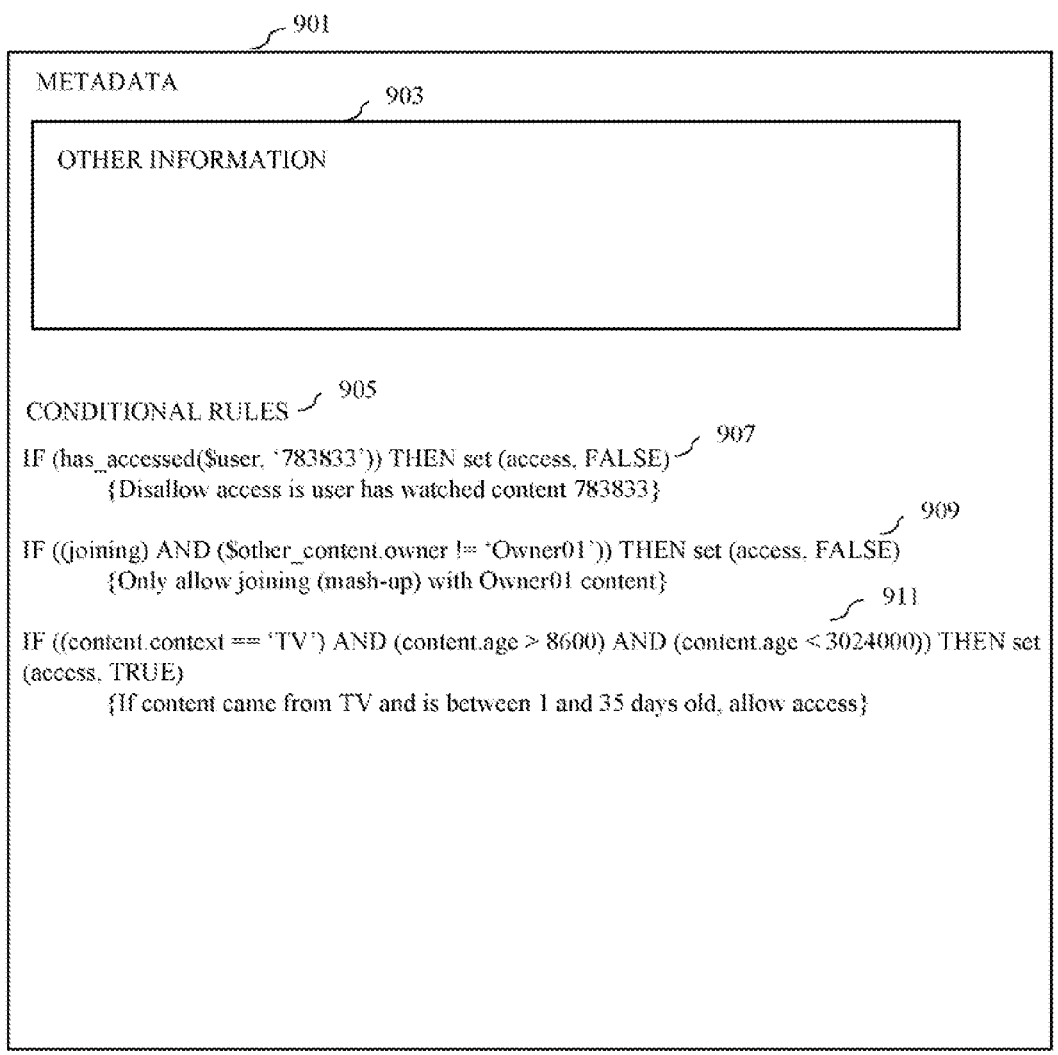
FIG. 9 is a diagram of example metadata having an example conditional rule set, in accordance with various embodiments.

FIG. 9 is a diagram of example metadata 901 having an example conditional rule set 905, in accordance with various embodiments. The metadata 901 may include other information 903 that provides information about the associated content. Other information 903 may also be, in some embodiments, metadata required for other content protection regimes such as a DRM regime. However, it is to be understood that content, in accordance with the embodiments, may include, or be associated with, other metadata, other than metadata 901, which is for some other purpose such as, for example, DRM. The metadata 901 of the various embodiments exists along with, and/or in conjunction with, any other metadata, or meta-content, that may be associated with any given piece of content. The metadata 901, in accordance with the embodiments, includes conditional rule set 905, which may correlate the content to one or more other arbitrarily selected content. The arbitrary correlated content may be the same content type or may be of a different content type without limitation. For example, the first content may be video and the associated metadata may correlate a second content which may be a word processing document, or, a photograph.

The example conditional rule set 905 is shown in readable pseudo code for purposes of understanding and explanation. The actual conditional rule set may, in accordance with the embodiments, be machine readable only and may further be encrypted in some embodiments. In the example of FIG. 9, a first conditional rule 907 disallows access for a given content if the user has accessed a specified content. The second conditional rule 909 prevents creating mash-ups unless the other content is owned by a specified author/owner. The third conditional rule 911 allows access only if the content came from a specified source, and is of a specified number of days old. Based on the examples and descriptions provided herein, other possible conditional rules may occur to those of ordinary skill, in accordance with the embodiments. A conditional rule set is correlated to a piece of content, and/or meta-content, (i.e. a "correlated content") when at least one of the conditional rules of the conditional rule set requires a condition related to the correlated content.

The conditional rules may be authored, updated, and/or modified in various ways in accordance with the embodiments. In one example, the access control manager may provide a user interface that author/owners may access by a web page in some embodiments. The user interface may provide a dropdown list to identify a specific content, or to upload a content to be protected. After the author/owner has identified the content, the user interface may provide a dropdown list of possible pre-created rules, for example in a human readable, human understandable, pseudo-code format, that may be selected using a cursor or mouse, to construct a usage policy for the content. Based on selected rule types, the user interface may also provide a dropdown list for other content that may be correlated with the author/owner's content. The other content may, in some embodiments be defined in a broad sense such as by, other author/owner, content type, content subject matter, content date, etc., or any other possible categorizations of content. The user interface may also provide an input screen for inputting additional information, or adding additional "other content" which the author/owner wished to correlate with the author/owner's content using the conditional rule set. The author/owner thereby constructs a usage policy for a specific piece of content in accordance with the embodiments. The user interface may also enable the author/owner to create a global usage policy for some, or all, of the author/owner's content using appropriate selectable options.

The various embodiments are not limited to conditional rules correlating other content. The usage policies and conditional rules, in accordance with the embodiments, may establish relationships based on user groups, sequential access, exclusive-or functions, or other Boolean functions, historical, contextual, user history based, location based, social-network based, etc., without limitation. The various embodiments therefore provide, among the other advantages, the advantage of the capability of creating new types of content subscription services. For example, users may subscribe together as a social group or group of friends. One use case example is that, a user of the social group, or group of friends, may be conferred access to content "A" for free, if no other friend accessed content "A" in the past month. If a friend has accessed content "A" in the past month, then the user may be charged a fee to access content "A." Based on the examples and description provided herein, various other possible applications and scenarios may occur to those of ordinary skill, in accordance with the embodiments. For example, a social graph structure may be created that is used by the access control manager to determine how various members of a subscriber group can access content.

Various frameworks may be utilized to create/construct the usage policies and associated metadata conditional rules in accordance with the embodiments. In one example embodiment, a social graph distributed file system may be constructed using Apache Hadoop. The relationships may also be constructed, or may include information, using a Resource Description Framework (RDF) in some embodiments. The metadata and/or conditional rules, in accordance with the embodiments, may employ or include information expressed in one or more Rights Expression Languages (REL), or may use proprietary formats. For example, the various embodiments may utilize ccREL, ODRL, XrML, MPEG-21, METSRights.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method of content rights management, the method comprising:
    obtaining a conditional rule set defining a content usage policy, the conditional rule set contained in metadata associated with a first content and correlated to at least a second content;
    obtaining the second content from a meta-content of the first content, the meta-content including at least one of analysis of the first content, analysis of at least one parameter of the first content, searchable time based reference data associated with the first content, or searchable location based reference data associated with the first content; and
    determining, dynamically, access rights based on the content usage policy and user history parameters, in response to determining that a request for the second content, in conjunction with the user history parameters, complies, or does not comply, with the conditional rule set.

2. The method of claim 1, comprising:
    conferring limited access rights for a first activity with respect to the first content and the second content, and blocking a second activity with respect to the first content and the second content, in response to determining that the request for the second content, in conjunction with the user history parameters, does not comply with the conditional rule set for the second activity.

3. The method of claim 1, comprising:
conferring access rights for the second content, based on the content usage policy and the user history parameters at a first time, in response to determining that the request for the second content, in conjunction with the user history parameters at the first time, complies with the conditional rule set; and
denying access rights for the second content, based on the content usage policy and the user history parameters at a second time, in response to determining that the request for the second content, in conjunction with the user history parameters at the second time, no longer complies with the conditional rule set.

4. The method of claim 2, where conferring limited access rights for a first activity with respect to the first content and the second content, and blocking a second activity with respect to the first content and the second content, comprises:
conferring access rights for sequential viewing of the first content and the second content; and
blocking editing of the first content and the second content.

5. The method of claim 2, where conferring limited access rights for a first activity with respect to the first content and the second content, and blocking a second activity with respect to the first content and the second content, comprises:
conferring access rights for viewing of the first content in a first login session and conferring access rights for viewing the second content only in a second login session separate from the first login session; and
blocking editing of the first content and the second content.

6. The method of claim 2, where conferring limited access rights for a first activity with respect to the first content and the second content, and blocking a second activity with respect to the first content and the second content, comprises:
conferring access rights for sequential viewing of the first content and the second content; and
blocking joining of the first content and the second content to create a third content.

7. The method of claim 3, comprising:
conferring access rights to view the second content, if the user history parameters at the first time indicate that the first content has previously been viewed by an indicated date; and
denying access rights to view the second content, if the user history parameters at the second time indicate that the second content has not previously been viewed prior to viewing of a third content.

8. An apparatus, comprising:
an access control manager, operative to:
obtain a conditional rule set defining a content usage policy, the conditional rule set contained in metadata associated with a first content and correlated to at least a second content;
obtain the second content from a meta-content of the first content, the meta-content including at least one of analysis of the first content, analysis of at least one parameter of the first content, searchable time based reference data associated with the first content, or searchable location based reference data associated with the first content; and
determine, dynamically, access rights based on the content usage policy and user history parameters, in response to determining that a request for the second content, in conjunction with the user history parameters, complies, or does not comply, with the conditional rule set.

9. The apparatus of claim 8, where the access control manager is operative to:
confer limited access rights for a first activity with respect to the first content and the second content, and block a second activity with respect to the first content and the second content, in response to determining that the request for the second content, in conjunction with the user history parameters, does not comply with the conditional rule set for the second activity.

10. The apparatus of claim 8, where the access control manager is operative to:
confer access rights for the second content, based on the content usage policy and the user history parameters at a first time, in response to determining that the request for the second content, in conjunction with the user history parameters at the first time, complies with the conditional rule set; and
deny access rights for the second content, based on the content usage policy and the user history parameters at a second time, in response to determining that the request for the second content, in conjunction with the user history parameters at the second time, no longer complies with the conditional rule set.

11. The apparatus of claim 8, where the access control manager is operative to confer limited access rights for a first activity with respect to the first content and the second content, and block a second activity with respect to the first content and the second content, by:
conferring access rights for sequential viewing of the first content and the second content; and
blocking editing of the first content and the second content.

12. The apparatus of claim 9, where the access control manager is operative to confer limited access rights for a first activity with respect to the first content and the second content, and blocking a second activity with respect to the first content and the second content, by:
conferring access rights for viewing of the first content in a first login session and conferring access rights for viewing the second content only in a second login session separate from the first login session; and
blocking editing of the first content and the second content.

13. The apparatus of claim 9, where the access control manager is operative to confer limited access rights for a first activity with respect to the first content and the second content, and blocking a second activity with respect to the first content and the second content, by:
conferring access rights for sequential viewing of the first content and the second content; and
blocking joining of the first content and the second content to create a mash-up of the first content with the second content.

14. The apparatus of claim 10, where the access control manager is operative to:
confer access rights to view the second content, if the user history parameters at the first time indicate that the first content has previously been viewed by an indicated date; and
deny access rights to view the second content, if the user history parameters at the second time indicate that the second content has not previously been viewed prior to viewing of a third content.

15. The apparatus of claim 8, wherein the access control manager resides on a server.

16. The apparatus of claim 8, wherein the access control manager resides on a user device.

17. A method of content rights management, the method comprising:

conferring, dynamically, access rights to a user device or a server, based on a usage policy, the usage policy defined by a conditional rule set contained in metadata associated with a first content, the conditional rule set correlated to at least a second content; and obtaining the second content from a meta-content of the first content, the meta-content including at least one of analysis of the first content, analysis of at least one parameter of the first content, searchable time based reference data associated with the first content, or searchable location based reference data associated with the first content.

\* \* \* \* \*